US012674342B2

(12) United States Patent
Seo

(10) Patent No.: US 12,674,342 B2
(45) Date of Patent: Jul. 7, 2026

(54) CINCHING DEVICE FOR VEHICLE LATCH

(71) Applicants: Hyundai Motor Company, Seoul (KR); Kia Corporation, Seoul (KR)

(72) Inventor: Yongdae Seo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 18/371,269

(22) Filed: Sep. 21, 2023

(65) Prior Publication Data

US 2024/0254812 A1 Aug. 1, 2024

(30) Foreign Application Priority Data

Feb. 1, 2023 (KR) ........................ 10-2023-0013737

(51) Int. Cl.

| | |
|---|---|
| ***E05B 81/20*** | (2014.01) |
| ***E05B 79/20*** | (2014.01) |
| ***E05B 81/24*** | (2014.01) |
| ***E05B 81/40*** | (2014.01) |
| ***E05B 83/38*** | (2014.01) |

(52) U.S. Cl.

CPC .............. *E05B 81/20* (2013.01); *E05B 79/20* (2013.01); *E05B 81/25* (2013.01); *E05B 81/40* (2013.01); *E05B 83/38* (2013.01)

(58) Field of Classification Search

CPC .......... E05B 81/20; E05B 81/25; E05B 81/40; E05B 77/46; E05B 77/48

See application file for complete search history.

(56) References Cited

U.S. PATENT DOCUMENTS

| | | | | |
|---|---|---|---|---|
| 6,808,213 B2 * | 10/2004 | Heller | E05B 79/20 | 292/216 |
| 7,445,092 B2 * | 11/2008 | Tachiiri | B60T 13/746 | 188/204 R |
| 7,891,468 B2 * | 2/2011 | Tsubouchi | B60T 11/046 | 73/862.473 |
| 8,104,373 B2 * | 1/2012 | Hayashi | F16C 1/12 | 188/1.11 E |
| 9,920,556 B2 * | 3/2018 | Byun | E05B 79/20 | |
| 2002/0108816 A1 * | 8/2002 | Taniguchi | B60T 13/746 | 188/2 R |
| 2007/0272504 A1 * | 11/2007 | Sakai | B60T 11/046 | 188/2 D |
| 2009/0247364 A1 * | 10/2009 | Sano | B60T 13/746 | 477/197 |
| 2019/0225118 A1 * | 7/2019 | Tindall | F16C 1/18 | |

FOREIGN PATENT DOCUMENTS

| | | | | |
|---|---|---|---|---|
| CN | 116989053 A * | 11/2023 | E05F 11/04 |
| DE | 4129919 A1 * | 3/1993 | B60T 7/107 |
| DE | 102017118470 A1 * | 2/2019 | F16H 25/20 |
| JP | 2008019973 A * | 1/2008 | |
| KR | 102290872 B1 * | 8/2021 | E05B 81/64 |
| KR | 20210117424 A * | 9/2021 | E05B 85/243 |

* cited by examiner

*Primary Examiner* — Alyson M Merlino

(74) *Attorney, Agent, or Firm* — MORGAN, LEWIS & BOCKIUS LLP

(57) ABSTRACT

A cinching apparatus for a vehicle latch includes a cable lever coupled, by a pin, to a lead nut which is moved along a lead screw by driving power of a single cinching actuator, and the cable lever and a plurality of latches are connected by a plurality of cinching cables so that a difference in cinching stroke between the plurality of latches may be absorbed, and cinching control is possible.

14 Claims, 5 Drawing Sheets

CINCHING DEVICE FOR VEHICLE LATCH

CROSS-REFERENCE TO RELATED APPLICATION

The present application claims priority to Korean Patent Application No. 10-2023-0013737 filed on Feb. 1, 2023, the entire contents of which is incorporated herein for all purposes by this reference.

BACKGROUND OF THE PRESENT DISCLOSURE

Field of the Present Disclosure

The present disclosure relates to a cinching apparatus for a vehicle latch, and more particularly, to a cinching apparatus for a vehicle latch, in which a single cinching actuator simultaneously operates a plurality of latches.

DESCRIPTION OF RELATED ART

In general, a door, hood, trunk, or tail gate for a vehicle separates the inside and outside of the vehicle and is configured to perform important functions of blocking external noise, rainwater, dust, wind, and the like and safely protecting an occupant by absorbing impact together with a vehicle body structure in the event of a collision.

There are various types of doors for a vehicle having doors for special purposes. However, hinge type swing doors are widely used for passenger vehicles.

Typically, the swing door refers to a door which is opened toward the outside of a vehicle body about a hinge shaft installed by a hinge bracket disposed between the swing door and the vehicle body. The advantage of the swing door is that the swing door is easily opened or closed and includes a simple structure, which makes it easy to maintain and repair the swing door.

Meanwhile, opposite swing doors are applied to some vehicles. The opposite swing doors provide wide openness when opened and make it easy for the occupant to get in or out of the vehicle.

The opposite swing doors are classified into a type having no B pillar and a type having the B pillar.

FIG. 1 is a side view illustrating a vehicle to which opposite swing doors according to an example of the related art are applied.

With reference to FIG. 1, in particular, in case that the opposite swing doors applied to the vehicle having no B-pillar, a hinge shaft of a front door 110 is installed on a vehicle body 100 and a front end of the front door 110, and a hinge shaft of the rear door 120 is installed on the vehicle body 100 and a rear end of the rear door 120.

In the case of the opposite swing doors, latch unites LC for maintaining locking states are installed on the front door 110 and the rear door 120.

The door latches LC are provided at lower and upper ends of the front door 110 and provided at a center of a rear end of the rear door 120.

The door latch LC refers to a device for keeping the door, trunk, or tail gate of the vehicle opened or closed. Recently, the type of door latch LC has been substituted with a forcibly opening/closing type of door latch LC using an actuator such as a motor as the convenience of the vehicle has been emphasized, and intelligent components have been introduced.

In particular, in the case of the vehicle having no B-pillar, two door latches LC need to be provided on at least one door. Therefore, two cinching actuators are also required to control the operations of the two door latches LC.

FIG. 2 is a view illustrating an example of a cinching device for a door latch in the related art that is applied to the front door of the vehicle in FIG. 1.

FIG. 2 is a view illustrating an example in which an upper door latch 111 and a lower door latch 113 are applied to the front door 110 in FIG. 1. An upper cinching device 131 including a cinching actuator 141 for controlling an operation of the upper door latch 111 is provided, and a lower cinching device 133 including a cinching actuator 143 for controlling an operation of the lower door latch 113 is provided.

In addition, in this case, the upper and lower cinching devices 131 and 133 are connected to the upper and lower door latches 111 and 113 by first and second cinching cables SC1 and SC2 in first and second cable covers OC1 and OC2.

However, in the case of the door having the two door latches 111 and 113 in the vehicle having no B-pillar, the two cinching devices 131 and 133 are required, which causes disadvantages in terms of weight and costs.

To cope with the disadvantages, research and development have been conducted to control the operations of the two door latches by using a single cinching device. However, because the two door latches 111 and 113 are positioned to be spaced from each other, a difference in cinching stroke between the door latches 111 and 113 is caused by stroke dispersion of the first and second cinching cables SC1 and SC2 and a position tolerance of a door panel.

The difference in cinching stroke causes a problem in which when one door latch is fastened to a striker, the other door latch is not fastened to the striker, such that the door is not completely closed.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a cinching apparatus for a vehicle latch, in which a cable lever is coupled, by a pin, to a lead nut which is moved along a lead screw by driving power of a single cinching actuator, and the cable lever and a plurality of latches are connected by a plurality of cinching cables so that a difference in cinching stroke between the plurality of latches may be absorbed, and cinching control is possible.

Various aspects of the present disclosure are directed to providing a cinching apparatus for a vehicle latch, which controls cinching on a plurality of latches, in which a lead nut is movably fastened to a lead screw connected to a cinching actuator by a gear, and a cable lever, which is pivotally coupled to the lead nut by a pin, is connected to the plurality of latches by cinching cables so that a difference in cinching stroke between the plurality of latches is absorbed, and the cinching is controlled.

That is, the cinching apparatus may include: a housing including a slot formed in a longitudinal direction in one side surface thereof: the cinching actuator mounted to the housing and including a rotation shaft on which a worm gear is provided: a lead screw provided in the housing and disposed in a direction perpendicular to the rotation shaft of the cinching actuator, the lead screw being rotatably provided in the slot of the housing and including a worm wheel provided at one side thereof and engaged with the worm gear; a lead nut fastened to the lead screw; and the cable lever disposed outside the housing and pivotally coupled to the lead nut by the pin passing through the slot, the cable lever including first and second opposite sides respectively connected to the first and second cinching cables respectively connected to first and second latches.

In the instant case, one side and one tip portion of the rotation shaft of the cinching actuator may be rotatably supported in the housing by bearings.

Furthermore, the cinching actuator may be configured as a motor configured for controlling a rotation direction and a rotation speed of the rotation shaft.

The lead nut may be disposed in the housing and configured as a quadrangular nut which is moved forward or rearward along the lead screw according to rotation of the lead screw.

A center portion of the cable lever may be fastened to a center portion of the lead nut by the pin through the slot of the housing so that the cable lever is rotatably coupled to the lead nut.

Furthermore, the cable lever may have first and second pinholes respectively formed at first and second opposite sides of the cable lever based on the pin, and first and second cable pins respectively connected to the first and second cinching cables may be fitted with the first and second pinholes so that the cable lever is connected to the first and second cinching cables.

Furthermore, the first and second cinching cables may be respectively inserted into and protected by first and second cable covers.

Furthermore, the plurality of latches may be configured as two door latches.

According to the cinching apparatus for a latch according to the exemplary embodiment of the present disclosure, the cinching of the two latches may be controlled by operation of the single cinching actuator. The lead nut may be configured to be moved along the lead screw by driving power of the single cinching actuator, the two latches may be connected to the cable lever by the cinching cables, and the cable lever may be coupled to the lead nut by the pin. Therefore, it is possible to absorb the difference in cinching stroke between the latches and control the cinching.

According to the cinching apparatus 10 for a latch according to the exemplary embodiment of the present disclosure, the operations of the dual latches, which are required for a coach door having no B-pillar, may be controlled by the single cinching actuator 20, which may exclude one cinching actuator. Furthermore, the structure configured for autonomously absorbing the difference in cinching stroke caused by tolerance of the peripheral components, the cinching cable, and the like may be applied, reducing costs and weight and allowing the structure to be used in common.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
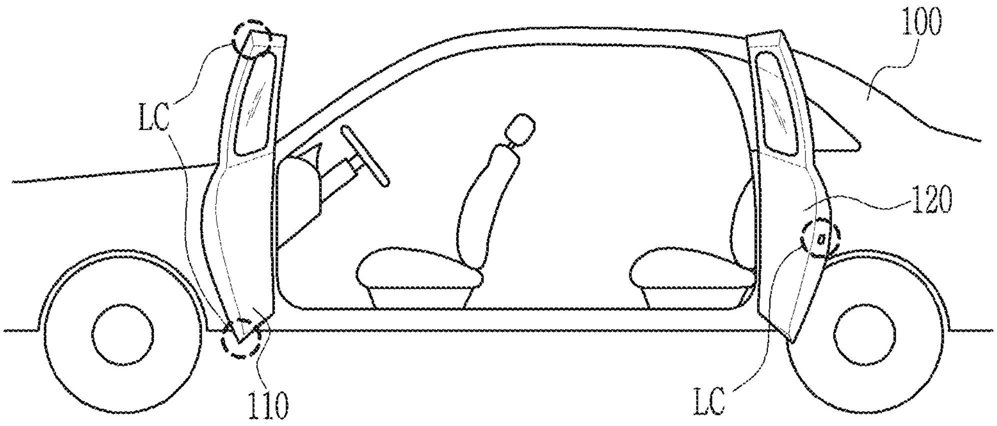
FIG. 1 is a side view exemplarily illustrating a vehicle to which opposite swing doors according to an example of the related art are applied.
Figure 2:
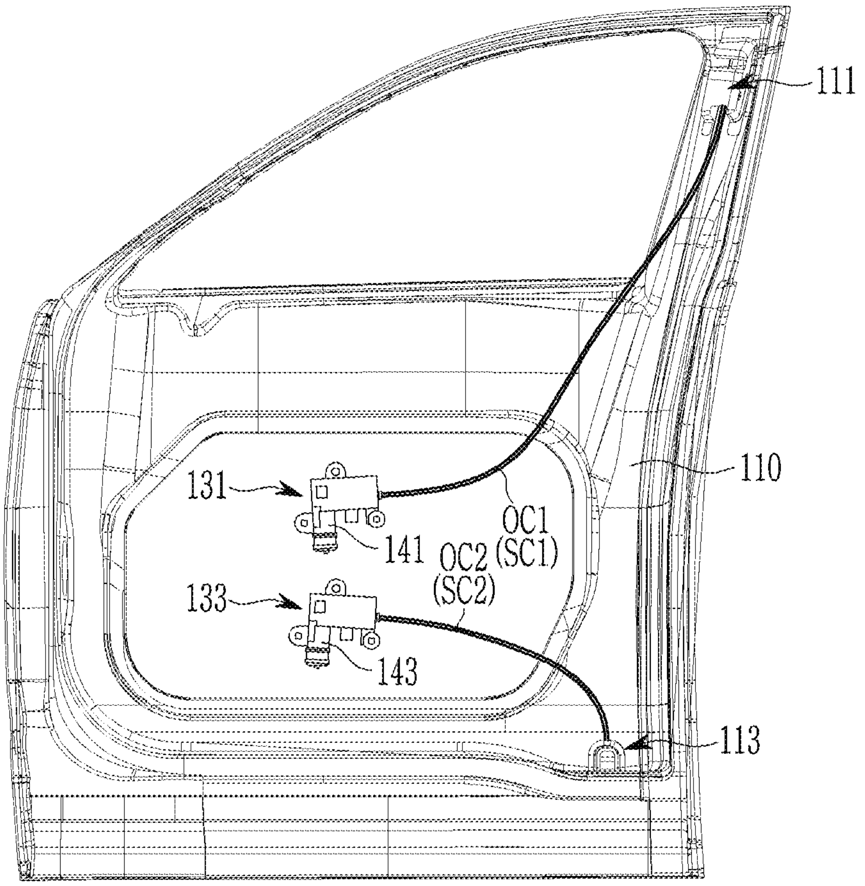
FIG. 2 Prior Art
FIG. 2 is a view exemplarily illustrating an example of a cinching device for a door latch in the related art which is applied to the front door of the vehicle in FIG. 1.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings.

Furthermore, the size and thickness of each component illustrated in the drawings are arbitrarily shown for ease of description, but the present disclosure is not limited thereto. To clearly describe several portions and regions, thicknesses thereof are enlarged or reduced. Furthermore, a part irrelevant to the description will be omitted to clearly describe the exemplary embodiment of the present disclosure.

A cinching device for a vehicle latch according to various exemplary embodiments of the present disclosure may not only be applied to a door latch, but also be applied to a component, such as a hood, a trunk, a tail gate, a rear door of a pick-up truck, or the like that includes a dual latch structure. In the exemplary embodiment of the present disclosure, the cinching device may be applied to a front or rear door including two door latches in a vehicle having no B-pillar. In the exemplary embodiment of the present disclosure, an example will be described in which the cinching device is applied to the front door.

Figure 3:
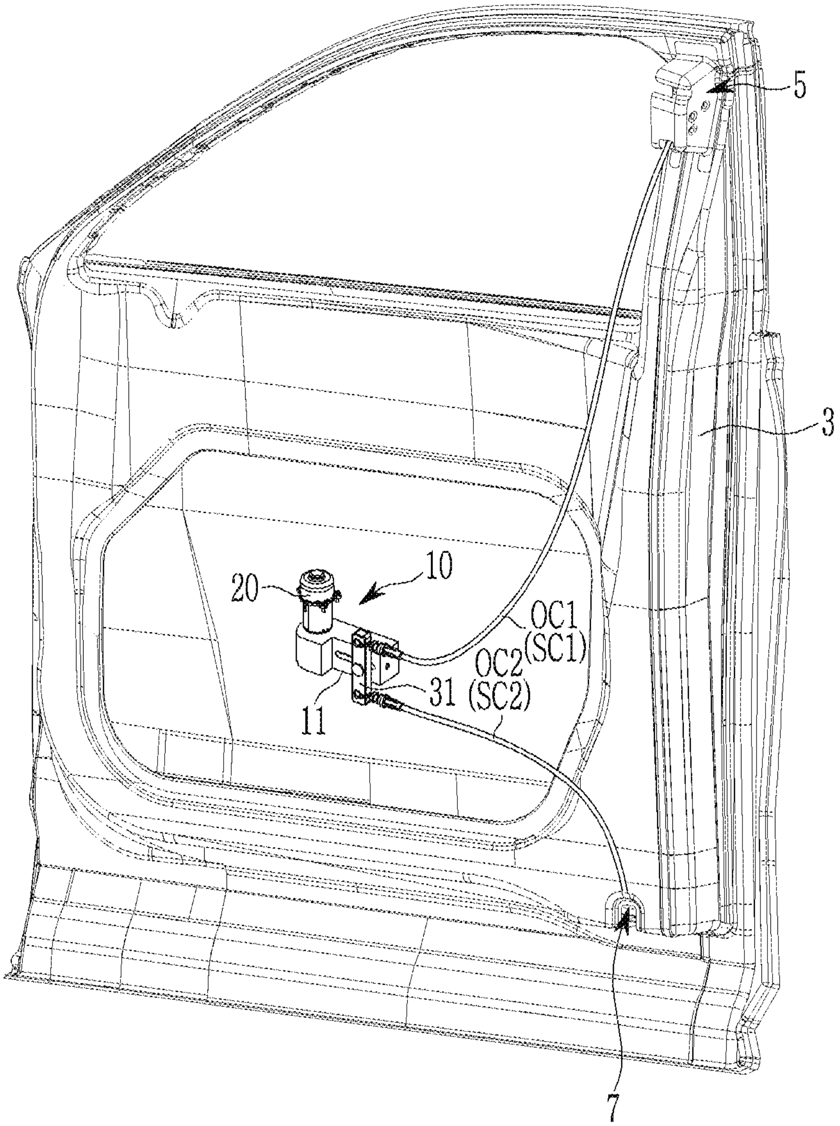
FIG. 3 is a perspective view of a front door to which a cinching device for a latch according to various exemplary embodiments of the present disclosure is applied.

FIG. 3 is a perspective view of a front door to which a cinching device for a latch according to various exemplary embodiments of the present disclosure is applied, and FIG.

4 is an overall perspective view of the cinching device for a latch according to the exemplary embodiment of the present disclosure.

Figure 4:
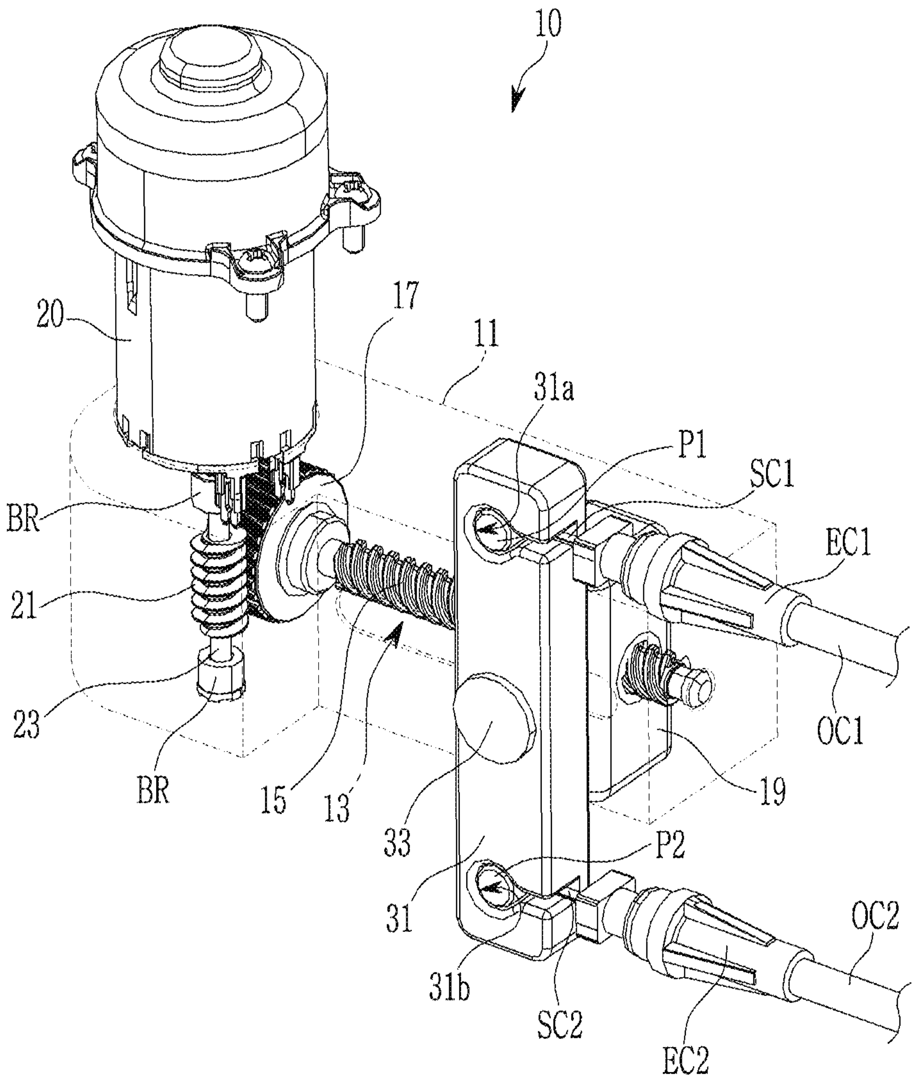
FIG. 4 is an overall perspective view of the cinching device for a latch according to the exemplary embodiment of the present disclosure.

With reference to FIG. 3 and FIG. 4, a cinching device 10 for a vehicle latch according to various exemplary embodiments of the present disclosure includes a housing 11, a cinching actuator 20, a lead screw 15, a lead nut 19, and a cable lever 31.

The cinching device 10 for a latch may be provided in a door panel 3 on which door latches 5 and 7 are respectively provided at upper and lower end portions in a vehicle having no B-pillar. The lead nut 19 is moved along the lead screw 15 by driving power of a single cinching actuator 20, and the two door latches 5 and 7 are connected to the cable lever 31 by first and second cinching cables SC1 and SC2, and the cable lever 31 is coupled to the lead nut 19 by a pin. Therefore, a difference in cinching stroke between the door latches 5 and 7 may be absorbed, and the cinching control is possible.

First, the housing 11 is fixed to one side of an internal portion of the door panel, and the cinching actuator 20 is provided at one side of an external portion of the door panel. The lead screw 15 and the lead nut 19 are provided in the housing 11.

Furthermore, a slot 13 is formed in one side surface of the housing 11 in a longitudinal direction thereof.

The cinching actuator 20 is assembled to one side of the external portion of the housing 11. A worm gear 21 is provided on a rotation shaft 23 of the cinching actuator 20 and disposed in the housing 11.

Furthermore, one side and tip of the rotation shaft 23 of the cinching actuator 20 are rotatably supported in the housing 11 by bearings BR.

The cinching actuator 20 may include, as an exemplary embodiment of the present disclosure, a motor configured for controlling a rotation direction and a rotation speed of the rotation shaft.

Furthermore, the lead screw 15 is provided in the housing 11. The lead screw 15 is rotatably provided in the housing 11 and disposed in a direction perpendicular to the rotation shaft 23 of the cinching actuator 20 (i.e., a longitudinal direction of the housing 11).

Furthermore, a worm wheel 17, which engages with the worm gear 21, is provided at one end portion of the lead screw 15 so that the lead screw 15 receives rotational driving power of the cinching actuator 20 through operations of gears of the worm gear 21 and the worm wheel 17.

The lead nut 19 is engaged to the lead screw 15.

That is, the lead nut 19 is configured as a quadrangular nut which is moved forward or rearward along the lead screw 15 in the housing 11 by the rotation of the lead screw 15. The lead nut 19 may be provided to be guided in a forward/rearward direction without being rotated by a separate guider in the housing 11.

Furthermore, the cable lever 31 is disposed outside the housing 11 and coupled to the lead nut 19 by the pin passing through the slot 13. The first and second cinching cables SC1 and SC2, which are respectively connected to the two door latches 5 and 7, are respectively connected to two opposite sides of the cable lever 31.

That is, a center portion of the cable lever 31 may be fastened to a center portion of the lead nut 19 by a lever pin 33 through the slot 13 so that the cable lever 31 may be rotatably coupled to the lead nut 19.

First and second pinholes 31*a* and 31*b* are respectively formed at two opposite sides of the cable lever 31 based on the lever pin 33.

Furthermore, first and second cable pins P1 and P2 are respectively connected to tips of the first and second cinching cables SC1 and SC2.

Therefore, the first and second cinching cables SC1 and SC2 are connected to the two opposite sides of the cable lever 31 as the first and second cable pins P1 and P2 are respectively fitted with the first and second pinholes 31*a* and 31*b*.

In the instant case, the first and second cinching cables SC1 and SC2 may be respectively inserted into and protected by first and second cable covers OC1 and OC2. In FIG. 4, non-described reference numerals "EC1" and "EC2" indicate first and second end caps.

Hereinafter, an operation for each step of the cinching device 10 for a vehicle latch according to the exemplary embodiment of the present disclosure will be described.

Figure 5:
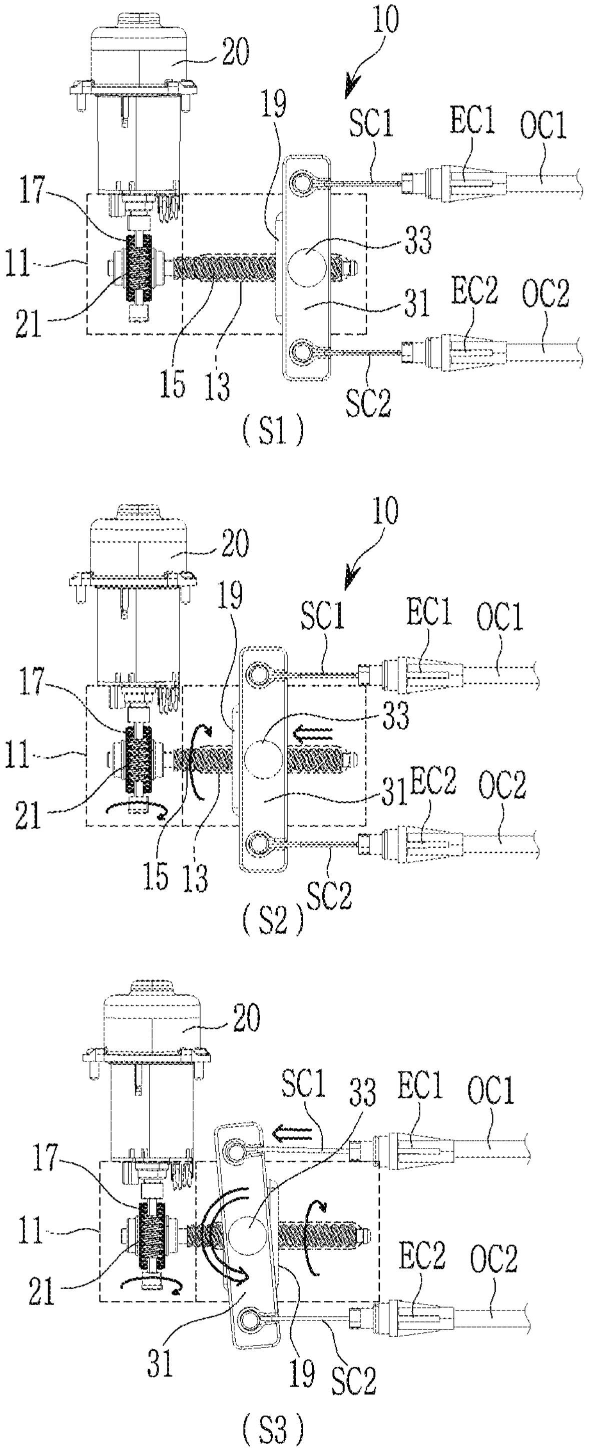
FIG. 5 is a view exemplarily illustrating operating states for respective steps of the cinching device for a latch according to the exemplary embodiment of the present disclosure.

FIG. 5 is a view exemplarily illustrating operating states for respective steps of the cinching device for a latch according to the exemplary embodiment of the present disclosure.

First, with reference to step S1 in FIG. 5, the cinching device 10 for a latch is in an ordinary state before a cinching function is performed, i.e., in a state in which the two door latches 5 and 7 are connected to the first and second cinching cables SC1 and SC2.

In the present state, the tension of the first and second cinching cables SC1 and SC2 is maintained by springs provided in the two door latches 5 and 7 so that the equilibrium of force maintains the balanced state in which the cable lever 31 is parallel to the lead nut 19.

Next, with reference to step S2 in FIG. 5, when the cinching actuator 20 rotates to perform a cinching operation on the two door latches 5 and 7, the lead screw 15 is rotated by the operations of the gears of the worm gear 21 and the worm wheel 17, and the lead nut 19 of the lead screw 15 moves in a direction in which the first and second cinching cables SC1 and SC2 are pulled.

Accordingly, the cable lever 31, which is connected to the lead nut 19 by the lever pin 33, moves together with the lead nut 19 and pulls the first and second cinching cables SC1 and SC2.

Therefore, the cinching operation begins to be performed on the two door latches 5 and 7 by cinching strokes of the first and second cinching cables SC1 and SC2, and two-stage locking of one door latch 7 is completed first.

In the instant case, the other door latch 5 is not subjected to the two-stage locking because of a difference in cinching stroke, and the corresponding door is in an incompletely locked state.

With reference to step S3 in FIG. 5, when the cinching actuator 20 continuously rotates, the cable lever 31 rotates about the lever pin 33 and additionally pulls the first cinching cable SC1 connected to the other door latch 5 while absorbing the difference in cinching stroke.

Therefore, the other door latch 5 is also subjected to the two-stage locking by the cinching operation so that the corresponding door comes into a completely locked state.

In the instant case, because one door latch 7 is in a state in which the two-stage locking is completed, the second cinching cable SC2 is not pulled while the first cinching cable SC1 connected to the other door latch 5 is additionally pulled. Therefore, the cable lever 31 absorbs the difference in cinching stroke while rotating about the lever pin 33.

Meanwhile, to perform the above-mentioned cinching operation, the operation of the cinching actuator 20 may be controlled by a control logic so that the cinching actuator 20 operates until a locking signal is inputted from locking switches of two door latches.

Accordingly, according to the cinching device 10 for a latch according to the exemplary embodiment of the present disclosure, the operations of the dual latches, which are required for a coach door having no B-pillar, may be controlled by the single cinching actuator 20, which may minimize the cinching actuator. Furthermore, the structure configured for autonomously absorbing the difference in cinching stroke caused by tolerance of the peripheral components, the cinching cable, and the like may be applied, reducing costs and weight and allowing the structure to be used in common.

Furthermore, the term related to a control device such as "controller", "control apparatus", "control unit", "control device", "control module", "control logic' or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A cinching apparatus in combination with a plurality of vehicle latches, wherein the cinching apparatus controls cinching of the plurality of vehicle latches, the cinching apparatus comprising:

a lead nut movably engaged to a lead screw connected to a cinching actuator by a worm wheel; and a cable lever, which is pivotally coupled to the lead nut by a pin, and connected to the plurality of vehicle latches by cinching cables, wherein a difference in a cinching stroke between the plurality of vehicle latches is absorbed by the cable lever, and the cinching is controlled by the cable lever, wherein the cinching cables include first and second cinching cables, and wherein the cinching apparatus further includes:

a housing having a slot formed along a longitudinal direction of the housing in one side surface of the housing;

the cinching actuator mounted to the housing and including a rotation shaft on which a worm gear is provided;

the lead screw provided in the housing and disposed in a direction perpendicular to the rotation shaft of the cinching actuator, the lead screw being rotatably provided in the housing and including the worm wheel provided at a side of the lead screw and engaged with the worm gear;

the lead nut engaged to the lead screw; and the cable lever disposed outside the housing and pivotally coupled to the lead nut by the pin passing through the slot, the cable lever including first and second opposite sides respectively connected to the first and second cinching cables respectively connected to first and second latches of the plurality of vehicle latches.

2. The cinching apparatus in combination with the plurality of vehicle latches, according to claim 1, wherein at least one side and one tip portion of the rotation shaft of the cinching actuator is rotatably supported in the housing by a bearing.

3. The cinching apparatus in combination with the plurality of vehicle latches, according to claim 1, wherein the cinching actuator includes a motor configured for controlling a rotation direction and a rotation speed of the rotation shaft.

4. The cinching apparatus in combination with the plurality of vehicle latches, according to claim 1, wherein the lead nut is disposed in the housing and configured as a nut which is selectively moved forward or rearward along the lead screw according to rotation of the lead screw.

5. The cinching apparatus in combination with the plurality of vehicle latches, according to claim 1, wherein a center portion of the cable lever is fastened to a center portion of the lead nut by the pin passing through the slot of the housing so that the cable lever is rotatably coupled to the lead nut.

6. The cinching apparatus in combination with the plurality of vehicle latches, according to claim 5, wherein the cable lever includes first and second pinholes respectively formed at the first and second opposite sides of the cable lever based on the pin, and first and second cable pins respectively connected to the first and second cinching cables are fitted with the first and second pinholes so that the cable lever is connected to the first and second cinching cables.

7. The cinching apparatus in combination with the plurality of vehicle latches, according to claim 1, wherein the first and second cinching cables are respectively inserted into and protected by first and second cable covers.

8. The cinching apparatus in combination with the plurality of vehicle latches, according to claim 1, wherein the plurality of vehicle latches is configured as two door latches.

9. A cinching apparatus in combination with a plurality of vehicle latches, wherein the cinching apparatus controls cinching of the plurality of vehicle latches, the cinching apparatus comprising:

a cinching actuator;

a lead screw engaged to the cinching actuator by a worm wheel;

a lead nut engaged to the lead screw and selectively movable along the lead screw according to rotation of the lead screw; and a cable lever, which is pivotally coupled to the lead nut by a pin, and connected to the plurality of vehicle latches by cinching cables, wherein a difference in a cinching stroke between the plurality of vehicle latches is absorbed by the cable lever, and the cinching is controlled by the cable lever, wherein the cinching cables include first and second cinching cables, wherein the cinching apparatus further includes a housing having a slot formed along a longitudinal direction of the housing in one side surface of the housing;

wherein the cinching actuator mounted to the housing and including a rotation shaft on which a worm gear is provided, wherein the lead screw provided in the housing and disposed in a direction perpendicular to the rotation shaft of the cinching actuator, the lead screw being rotatably provided in the housing and including the worm wheel provided at a side of the lead screw and engaged with the worm gear, wherein the cable lever disposed outside the housing and pivotally coupled to the lead nut by the pin passing through the slot, the cable lever including first and second opposite sides respectively connected to the first and second cinching cables respectively connected to first and second latches of the plurality of vehicle latches.

10. The cinching apparatus in combination with the plurality of vehicle latches, according to claim 9, wherein the cinching actuator includes a rotation shaft and the worm gear mounted on the rotation shaft, and wherein the lead screw includes the worm wheel provided at one side of the lead screw and engaged with the worm gear.

11. The cinching apparatus in combination with the plurality of vehicle latches, according to claim 10, wherein the plurality of vehicle latches include first and second latches, wherein the clinching cables includes first and second cinching cables, and wherein the cable lever includes first and second opposite sides respectively connected to the first and second cinching cables respectively connected to the first latch and the second latch.

12. The cinching apparatus in combination with the plurality of vehicle latches, according to claim 11, wherein the cable lever includes first and second pinholes respectively formed at the first and second opposite sides of the cable lever, and first and second cable pins respectively connected to the first and second cinching cables are fitted with the first and second pinholes so that the cable lever is connected to the first and second cinching cables.

13. The cinching apparatus in combination with the plurality of vehicle latches, according to claim 11, wherein the first and second cinching cables are respectively inserted into and protected by first and second cable covers.

14. The cinching apparatus in combination with the plurality of vehicle latches, according to claim 10, wherein the cinching actuator further includes a motor configured for controlling a rotation direction and a rotation speed of the rotation shaft.

* * * * *